(12) United States Patent
Jung et al.

(10) Patent No.: US 7,758,225 B2
(45) Date of Patent: *Jul. 20, 2010

(54) KEY PAD LIGHTING APPARATUS FOR A PORTABLE TERMINAL

(75) Inventors: Sun-Tae Jung, Anyang-si (KR); Joo-Hoon Lee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/452,624

(22) Filed: Jun. 14, 2006

(65) Prior Publication Data

US 2007/0041573 A1 Feb. 22, 2007

(30) Foreign Application Priority Data

Jul. 15, 2005 (KR) .................... 10-2005-0064237

(51) Int. Cl.
*F21V 7/04* (2006.01)

(52) U.S. Cl. .................... 362/602; 362/558; 200/314

(58) Field of Classification Search .................. 362/85, 362/600, 602, 29, 30, 555, 582, 551; 200/308, 200/310, 313, 314

See application file for complete search history.

(56) References Cited

U.S. PATENT DOCUMENTS

| | | | | |
|---|---|---|---|---|
| 2,347,665 A * | 5/1944 | Christensen et al. | .......... | 40/363 |
| 5,097,396 A * | 3/1992 | Myers | .......... | 362/551 |
| 5,237,607 A | 8/1993 | Diamantis | .......... | 379/419 |
| 5,542,016 A | 7/1996 | Kaschke | .......... | 385/123 |
| 5,550,657 A * | 8/1996 | Tanaka et al. | .......... | 349/62 |
| 5,847,336 A * | 12/1998 | Thornton | .......... | 200/5 A |
| 5,857,049 A | 1/1999 | Beranek et al. | .......... | 385/91 |
| 6,108,060 A * | 8/2000 | Funamoto et al. | .......... | 349/65 |
| 6,134,092 A * | 10/2000 | Pelka et al. | .......... | 361/31 |
| 6,285,420 B1 * | 9/2001 | Mizumo et al. | .......... | 349/65 |
| 6,530,669 B2 * | 3/2003 | Toyoda | .......... | 362/610 |
| 6,806,920 B2 * | 10/2004 | Hayashi et al. | .......... | 349/58 |
| 6,853,410 B2 * | 2/2005 | Matsuda et al. | .......... | 349/67 |
| 6,918,677 B2 * | 7/2005 | Shipman | .......... | 362/26 |
| 7,125,155 B2 * | 10/2006 | Sakuda et al. | .......... | 362/632 |

(Continued)

FOREIGN PATENT DOCUMENTS

JP 54-68564 5/1979

(Continued)

OTHER PUBLICATIONS

Miyashita, Shinichi; Patent Application Publication No. US 2004/0130912 A1; Publication Date: Jul. 8, 2004; "Light Guide Plate and Support Unit for the Same;".

*Primary Examiner*—Gunyoung T Lee
(74) *Attorney, Agent, or Firm*—Cha & Reiter, LLC

(57) ABSTRACT

A key pad lighting apparatus for a portable terminal includes: a waveguide in which a plurality of key buttons are arranged at one surface thereof; at least one light source provided at one side of the waveguide for introducing the light into the waveguide; and a guide member surrounding the light source for preventing a discharge of the light and for guiding the light into the waveguide. The key pad lighting apparatus can uniformly illuminate the key buttons installed in the key pad with a few light source using less light sources which helps to reduce the power consumption.

19 Claims, 4 Drawing Sheets

U.S. PATENT DOCUMENTS

| | | | |
|---|---|---|---|
| 7,142,189 B2 * | 11/2006 | Engelmann | 345/102 |
| 7,196,693 B2 * | 3/2007 | Chien et al. | 345/168 |
| 7,232,969 B1 * | 6/2007 | Hsu et al. | 200/310 |
| 7,294,803 B2 * | 11/2007 | Lee et al. | 200/314 |
| 7,335,844 B2 * | 2/2008 | Lee et al. | 200/310 |
| 7,411,142 B2 * | 8/2008 | Jung et al. | 200/314 |

FOREIGN PATENT DOCUMENTS

| | | |
|---|---|---|
| JP | 64-31628 | 2/1989 |
| JP | 04-28691 | 3/1992 |
| JP | 04-075217 | 3/1992 |
| JP | 04-304684 | 10/1992 |
| JP | 05-90756 | 12/1993 |
| JP | 3100868 U | 1/2004 |
| JP | 2004-069751 | 3/2004 |
| JP | 2004-079499 | 3/2004 |
| JP | 2004-303658 | 10/2004 |
| JP | 2004-356028 | 12/2004 |
| JP | 2005-116428 | 4/2005 |
| JP | 2005-148115 | 6/2005 |
| KR | 20-0388305 | 6/2005 |

* cited by examiner

KEY PAD LIGHTING APPARATUS FOR A PORTABLE TERMINAL

CLAIM OF PRIORITY

This application claims priority to an application entitled "KEY PAD LIGHTING APPARATUS OF PORTABLE TERMINAL," filed with the Korean Intellectual Property Office on Jul. 15, 2005 and assigned Serial No. 2005-64237, the contents of which are incorporated herein by reference.

BACKGROUND OF THE INVENTION

1. Field of the Invention

The present invention relates to a portable terminal, and more particularly to a key pad lighting apparatus of a portable terminal.

2. Description of the Related Art

A modem portable terminal is capable of providing, in addition to radio communication functions, various types of content services such as voice communication service, short message transmission, mobile banking, TV, online gaming, VOD (video on demand), etc.

Portable terminals are classified according to their form: a bar-type terminal in which communication circuits and input/output devices, such as a microphone unit and a speaker unit, are installed in a single housing, a flip-type terminal in which a flip cover is installed in the bar-type terminal, and a folder-type terminal which can be opened and closed and in which input/output devices are distributed in the housing. Recently, a slider-type terminal has appeared together with the folder-type terminal to improve the portability, convenience, and aesthetic enhancement.

A portable terminal typically includes a key pad as an input device for inputting information, searching and executing stored information and multimedia files, and selecting a menu. The input devices can also be a touch screen, but most users still control the portable terminal using a key pad having a plurality of keys.

FIG. 1 is a cross-sectional view of a conventional key pad 100 used in a portable terminal. As shown, the conventional key pad 100 includes a printed circuit board 101 in which dome switches 111 are arranged on one surface thereof and a silicone pad 102 on which a plurality of key buttons 123 are arranged. The printed circuit board 101 can be formed of a flexible printed circuit board.

The key buttons 123 are disposed above the dome switches 111, and contact bosses 121 facing the dome switches 111 are formed on the silicone pad 102. If the key buttons 123 are activated by a user, the silicone pad 102 is deformed which in turn causes the contact bosses 121 to activate the dome switches 111. Letters are printed on the key buttons 123 so that a user can input letters to actuate different functions through the key buttons 123. Further, in order to facilitate the use of the key pad at night, the key pad 100 includes a lighting apparatus using light emitting diodes 113, etc. The lighting apparatus including a plurality of light emitting diodes 113 installed on the printed circuit board 101 is provided in the key pad 100. More particularly, the light emitting diodes 113 are provided on both sides of the lower portion of each key button 123. The light generated from the light emitting diodes 113 is diffused through the silicone pad 102 to illuminate the letters printed on the key buttons 123. The lighting apparatuses can be used to illuminate the key pads whenever the key pads are in use.

However, according to the conventional lighting apparatus used in a portable terminal, the assembling process is complicated as the light emitting diodes more than or equal to the number of the key buttons are typically installed on the lower portion of the key buttons. Namely, in the case of a general 3×4 arrangement number key pad, sixteen light emitting diodes are typically provided on both sides of the lower portion of the key buttons. However, in order to accommodate the plurality of light emitting diodes on the printed circuit board, the printed circuit patterns becomes complicated, and additional processes for installing the light emitting diodes are required, thereby increasing the manufacturing cost.

SUMMARY OF THE INVENTION

Accordingly, the present invention has been made to solve the above-mentioned problems occurring in the prior art and provides additional advantages, by providing a key pad lighting apparatus for a portable terminal which reduces the number of light sources required for illuminating a key pad, while simplifying the manufacturing process and reducing cost.

One aspect of the invention is to provide a key pad lighting apparatus for a portable terminal which can restrict an unnecessary discharge of the light generated from the light sources, while uniformly illuminating a key pad even though the number of light sources are reduced.

In one embodiment, a key pad lighting apparatus for a portable terminal includes: a waveguide in which a plurality of key buttons is arranged at one surface thereof; at least one light source provided at one side of the waveguide for introducing the light to illuminate the key buttons into the waveguide; and a guide member surrounding the light source for preventing a discharge of the light and for guiding the light into the waveguide.

BRIEF DESCRIPTION OF THE DRAWINGS

The above features, and advantages of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein is omitted to avoid making the subject matter of the present invention unclear.

Figure 1:
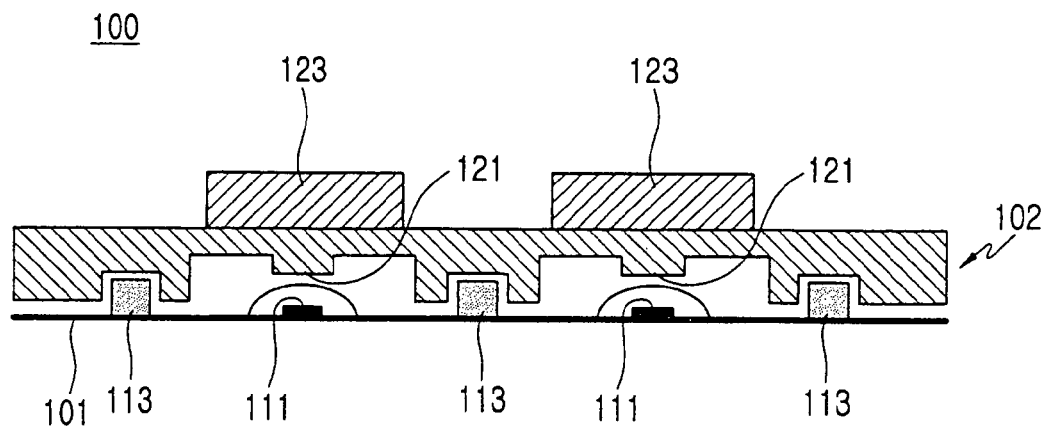
FIG. 1 is a cross-sectional view of a conventional key pad used in a portable terminal.
Figure 2:
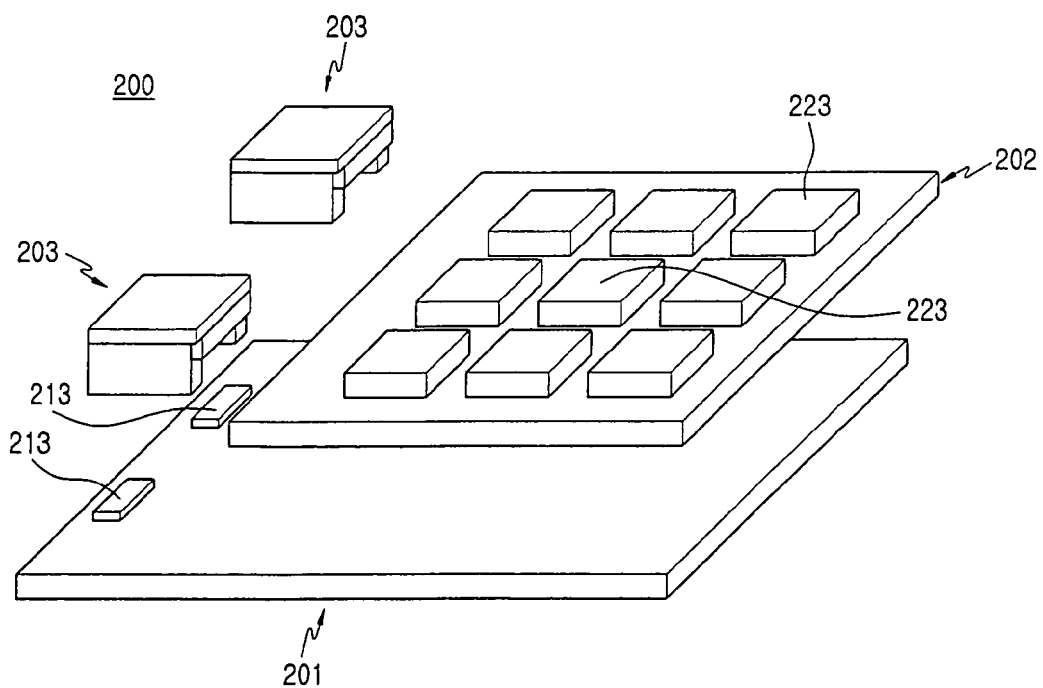
FIG. 2 is an exploded perspective view of a key pad for a portable terminal which includes a key pad lighting apparatus according to a first embodiment of the present invention.
Figure 3:
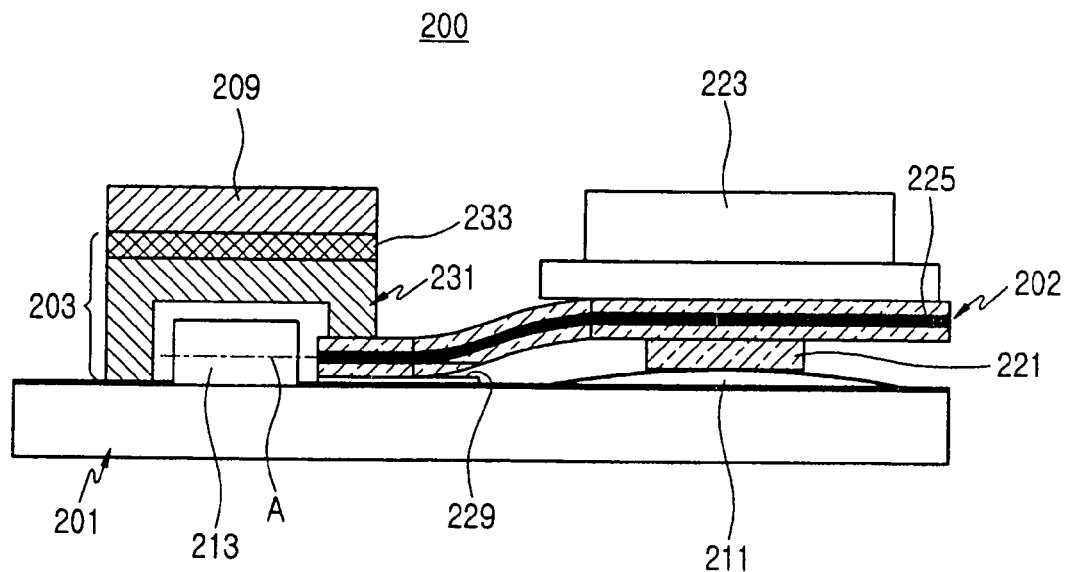
FIG. 3 is a cross-sectional view of the lighting apparatus of FIG. 2.

FIG. 2 illustrates a key pad 200 for a portable terminal according to an embodiment of the present invention, and FIG. 3 is a cross-sectional of the key pad lighting apparatus of FIG. 2.

Figure 4:
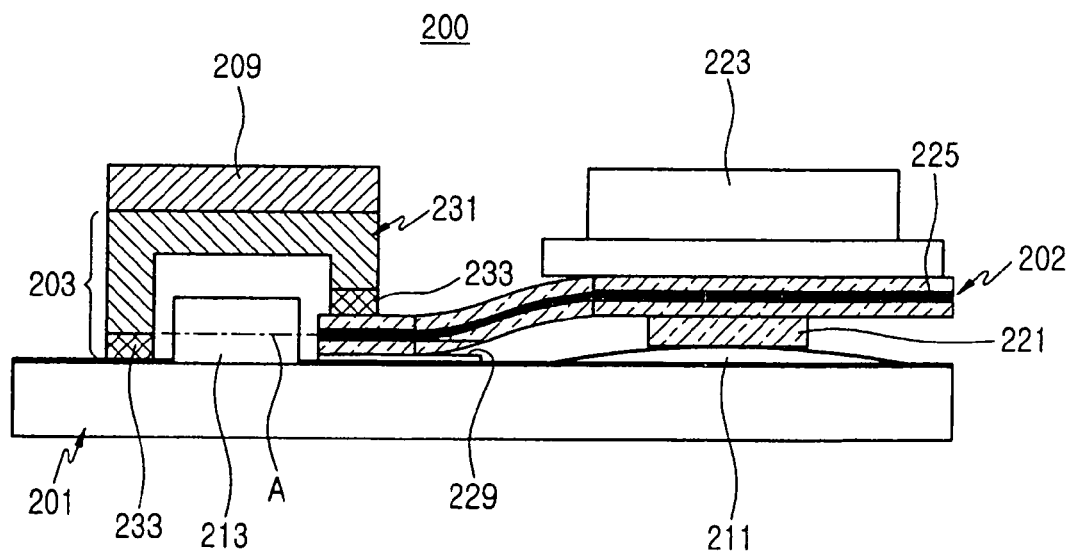
FIG. 4 is a cross-sectional view of a key pad for a portable terminal which includes a lighting apparatus according to a second embodiment of the present invention.
Figure 5:
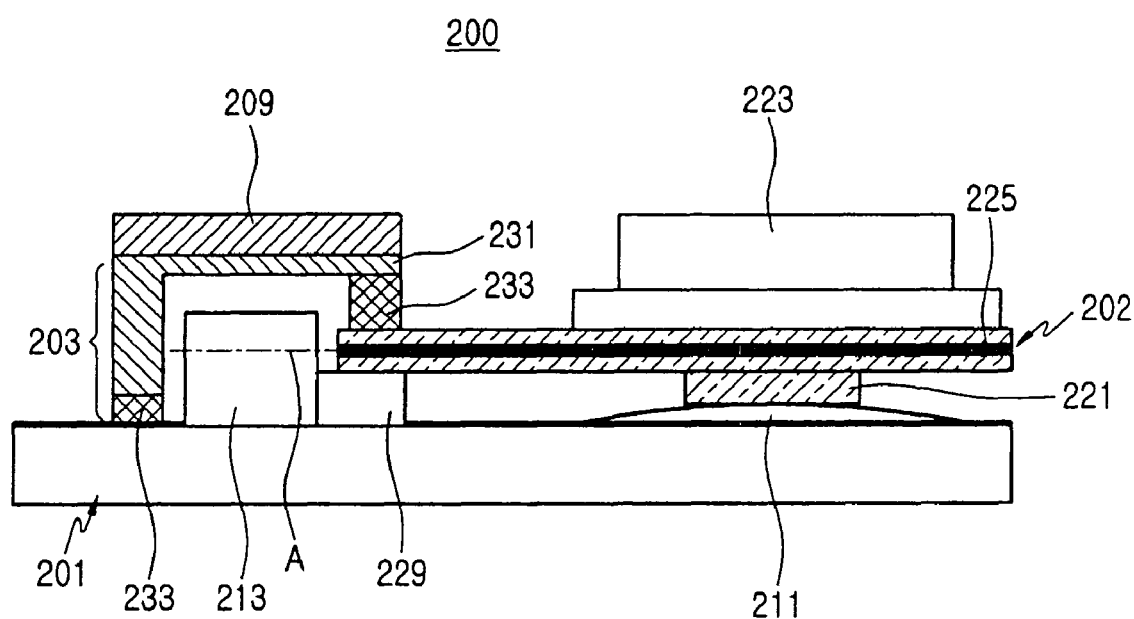
FIG. 5 is a cross-sectional view of a key pad for a portable terminal which includes a lighting apparatus according to a third embodiment of the present invention.

The construction and operation of the second embodiment (FIG. 4) and third embodiment (FIG. 5) are essentially same as that described above with respect to FIGS. 2 and 3, except that the waveguide 202 and the placement of a guide body 231 and a buffer 233 are different. Hence, the discussion of similar components described in FIGS. 4 and 5 is omitted to avoid redundancy in the specification, as they are described with respect to FIG. 3.

As shown in FIGS. 2 and 3, the key pad 200 of a portable terminal according to the embodiment of the present invention includes a waveguide 202 in which a plurality of key buttons 223 are disposed at one surface thereof, at least one light source 213 provided at one side of the wave guide 202, and a guide member 203 provided so as to surround the light source 213 to introduce light to illuminate the key buttons into the waveguide 202. It is preferable that the light source 213 includes a light emitting diode having a low power consumption that can be used for a long time.

The waveguide 202 may be manufactured using an optical material or a light panel formed of polyurethane, silicone, etc. The methods of manufacturing the waveguide using an optical material may involve integrating a plastic optical fiber in a pad of planar-type, forming a core layer of planar-type and clad layers on both surfaces of the core layer, and forming an optical fiber array by arranging optical fibers in which the optical fiber array is used as the waveguide. It is the plastic optical fiber may be manufactured of a material such as polyurethane, silicone, etc., which can guide or diffuse the light. At least one plastic optical fiber may be buried in the pad so that the light can be guided through the buried optical fiber. Scattered reflection patterns may be formed in the plastic optical fiber at positions corresponding to the key buttons 223.

Figure 6:
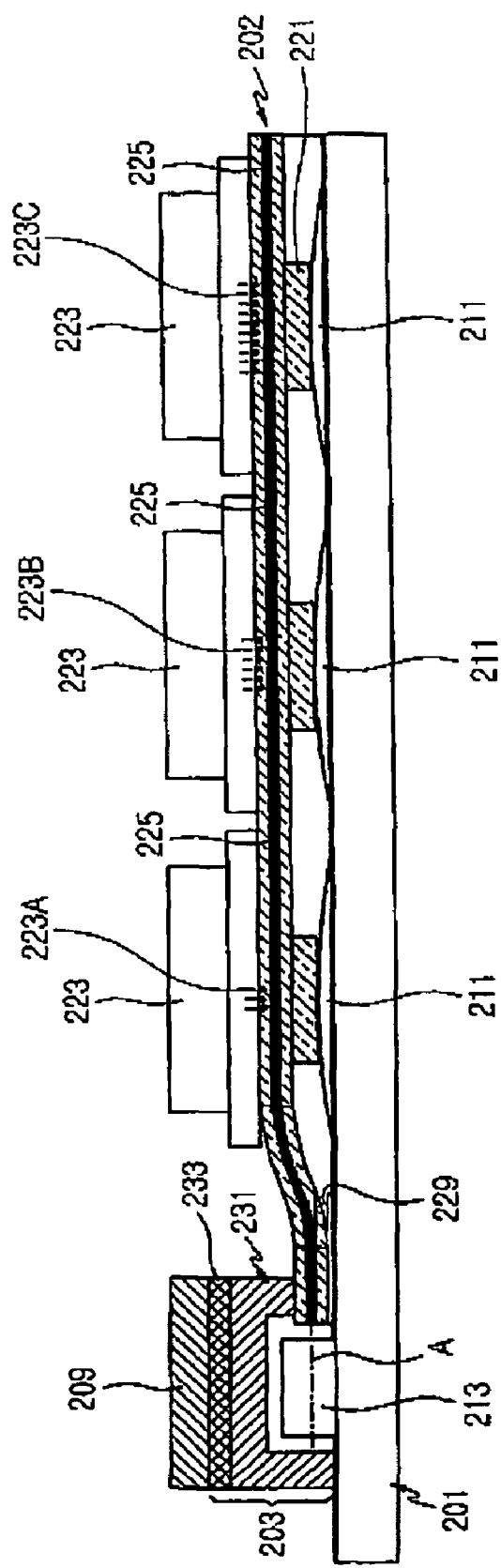
FIG. 6 is a cross-sectional view of the lighting apparatus of FIG. 2 showing an example of reflection patterns.

Referring to FIG. 3, the plastic optical fiber may be arranged in an optical axis A of the light source 213 to guide the light generated from the light source 213. Then, the light guided through the plastic optical fiber is reflected by the scattered reflection patterns, and the light of the optical fiber, which does not satisfy the total reflection conditions, is discharged outside the plastic fiber, thus illuminating the key buttons 223. As shown in FIG. 6, it is preferable that the scattered reflection patterns 223B are formed more densely at positions away from the light source than the scattered reflection patterns 223A, which are closer to the light source 213, thereby securing uniform intensities of illumination over the entire waveguide 202.

If the plastic optical fiber is used to form the waveguide 202, one or more than two plastic optical fibers can be arranged according to the arranged patterns of the key buttons 223. As such, the number of the light sources 213 may correspond to the number of the plastic optical fibers.

Meanwhile, the key buttons 223 can be illuminated by forming an optical fiber array with a plurality of plastic optical fibers and then forming scattered reflection patterns in the plastic optical fibers constituting the optical fiber array. For example a waveguide 202 can be formed only with plastic optical fibers by arranging the plurality of plastic optical fibers along the arrangement direction of the key pads 223.

If a core layer and a clad layer are used to form the waveguide 202, the core layer functions as a light guiding layer. Namely, the light generated from the light source 213 is guided and diffused to the entire waveguide through the core layer. Then, scattered reflection patterns are formed in a border surface between the core layer and the clad layer and at positions corresponding to the key buttons 223 to reflect the light guided and diffused through the core layer. The light reflected by the scattered reflection patterns, which does not satisfy the total reflection conditions, is discharged outside the waveguide 202 to illuminate the key buttons 223.

If an optical material is used to form the waveguide 202, the pad includes the light guiding layer 225, the light generated from the light source 213 is guided, and the light guided through the scattered reflection patterns is discharged to the outside to illuminate the key buttons 223. Here after the key buttons 223 are arranged by using a separate base film etc., the key buttons 223 can be attached to one surface of the wave guide 202.

If the waveguide 202 is manufactured with a light panel of polyurethane or silicone, since it is manufactured with a single material, the manufacturing cost is lower compared with that of an optical material. Further, since the polyurethane or silicone can guide and diffuse the light, no additional light guiding layer 225 is required. The light generated from the light source 213 is diffused to the light panel of polyurethane or silicone to illuminate the key buttons 223. It is preferable that in order to prevent an excessive discharge of the light, both surfaces of the waveguide 202 are coated with a light shielding material, and the light shielding coat is removed at a portion at which the key buttons 223 are attached.

Any one of the above-mentioned waveguides 202 is mounted onto a printed circuit board 201 in which a plurality of dome switches 211 is disposed so as to correspond to the key buttons 223. The printed circuit board 201 may be manufactured using a flexible printed circuit. The dome switches 211 are located so as to be opposite to contact bosses 221 formed on the other surface of the waveguide 202, and if the key buttons 223 are manipulated, the corresponding dome switches 211 are operated to generate signals corresponding to the key values.

The periphery of the waveguide 202 is fixed to the printed circuit board 201, and the light source 213 is also installed to the printed circuit board 201 at one side of the wave guide 202. In order to arrange the waveguide 202 in the optical axis A of the light source 213, a height regulation member 229 can be attached between the waveguide 202 and the printed circuit board 201.

Referring to FIGS. 3 and 5, when the waveguide 202 is arranged in the optical axis A of the light source 213 by using the height regulation member 229, the periphery of the waveguide 202 can be curved or planar. As shown in FIG. 5, in the case that the waveguide 202 has a planar shape, the loss or discharge of the light guided and diffused through the interior of the waveguide 202 can be prevented more effectively.

The guide member 203 surrounds the light source 213 and includes a guide body 231. The guide member 203 is fixed to the printed circuit board 201 or the inner surface of a terminal housing 209 (partially shown). As shown in FIGS. 3 and 4, a buffer member 233 can be interposed between the printed circuit board 201 and the guide body 231, or between the inner surface of the terminal housing 209 and the guide body 231. This structure addresses a manufacture tolerance which can be generated when the guide member 203 is manufactured in a condition in which the interval between the printed circuit board 201 and the inner surface of the terminal housing 209 is maintained constant. Namely, in the case that tolerance is generated in the manufacturing process of the guide member 203, if the guide member 203 is assembled, the stress generated in the printed circuit board 201 and the terminal housing 209 can be lessened by the buffer member 233. Since this structure is provided to lessen the stress due to a manufacture tolerance, it is preferable that the buffer member 233 is formed of a resilient member, i.e., polyurethane, silicone, sponge, or the like.

The guide member 203, particularly, the guide body 231 has a hexahedral shape surrounding the light source 213, and a portion of the guide body 231 which makes a contact with one side end of the waveguide is opened. Further, the surface of the guide body 231 which is fixed to the inner side surface of the terminal housing 209, or which is fixed to the printed circuit board 201, can be opened. As a result, all surfaces of the guide member 203 except for the surface through which the light of the light source 213 is discharged are closed to shield the light source from outside. Further, even though the guide member 203 is formed of a metal material or a synthetic resin, it is preferable that at least the inner surface thereof is coated with a material which can reflect a visible ray, such as a metal material.

In the case that the guide member 203 is formed of a synthetic resin, the guide member 203 can be manufactured to be integrated with the terminal housing 209 through injection-molding.

Since the inner surface of the guide member 203 reflects the light, even in the case that the light generated from the light source 213 is not introduced into the waveguide 202, it is reflected by the inner surface of the guide member 203 and is consequentially introduced into the waveguide 202. Therefore, the light generated from the light source 213 can be prevented from being discharged to the outside unnecessarily and can be introduced mainly into the waveguide 202. Therefore, the light generated from the light source 213 is prevented from being discharged to the outside, is guided and diffused to the entire waveguide 202, and is discharged at positions corresponding to the key buttons 223, thereby illuminating the key buttons 223 efficiently.

As mentioned above, according to the key pad light apparatus according to the present invention, the light source is installed at one side of the waveguide, and the waveguide is arranged in the optical axis of the light source. The key buttons installed in the entire key pad can be illuminated with a few light sources. Since a discharge of the light generated from the light source to the outside is minimized by using the guide member, the illumination intensity of the key pad can be uniformly maintained. Therefore, the manufacturing process for installing a lighting apparatus in a key pad of a portable terminal becomes simple, thereby reducing the manufacturing cost. Further, the number of light sources and power consumption is reduced compared to the conventional technique.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A key pad lighting apparatus for a portable terminal, comprising:
    a printed circuit board in which a plurality of dome switches are disposed;
    a waveguide in which a plurality of key buttons are disposed at one surface thereof, the waveguide mounted onto the printed circuit board such that the dome switches correspond to the key buttons;
    at least one light source provided at one end of the waveguide for generating a light into the waveguide to illuminate the key buttons; and
    a height regulating member positioned between the waveguide and the printed circuit board for regulating a height of the waveguide adjacent to the at least one light source;
    wherein the one end of the waveguide that is proximal to the at least one light source comprises a receiving portion that is arranged in an optical axis of the light source by the height regulating member so that a central axis of the waveguide is aligned with a central axis of the light source;
    wherein an illuminating portion of the waveguide in vertical alignment with an actuated keybutton of said plurality of keybuttons has a deformed shape along the actuated keybutton; and
    wherein the height regulating member maintains an optical axis of the receiving portion of the waveguide.

2. The key pad lighting apparatus according to claim 1, the lighting apparatus further comprises a guide member surrounding the light source for preventing a discharge of the light and for guiding the light into the waveguide.

3. The key pad lighting apparatus according to claim 2, wherein the guide member has a hexahedral shape having an opened surface towards the waveguide.

4. The key pad lighting apparatus according to claim 2, wherein an inner surface of the guide member is coated with a metal material to reflect the light generated from the light source.

5. The key pad lighting apparatus according to claim 2, wherein the guide member is made of a metal material and the inner surface thereof reflects the light generated from the light source.

6. The key pad lighting apparatus according to claim 1, wherein the light source is a light emitting diode.

7. The key pad lighting apparatus according to claim 1, wherein the waveguide is a light panel formed of polyurethane or silicone.

8. The key pad lighting apparatus according to claim 1, wherein the waveguide comprises at least one plastic optical fiber.

9. The key pad lighting apparatus according to claim 8, wherein the plastic optical fiber comprises scattered reflection patterns formed at positions corresponding to the key buttons so that the light guided by the plastic optical fiber is partially discharged to illuminate the key buttons.

10. The key pad lighting apparatus according to claim 9, wherein the scattered reflection patterns are formed more densely at positions away from the light source to secure uniform illumination intensities over the entire waveguide.

11. The key pad lighting apparatus according to claim 1, wherein the waveguide comprises a core layer and clad layers stacked on both surfaces of the core layer so that the light from the light source is guided through the core layer.

12. The key pad lighting apparatus according to claim 1, wherein a portion of the waveguide is formed of a light guiding layer arranged in an optical axis of the light source.

13. The key pad lighting apparatus according to claim 2, wherein the terminal comprises a housing and a printed circuit board disposed in the housing, wherein the guide member is fixed to an inner side wall of the housing or the printed circuit board.

14. The key pad lighting apparatus according to claim 13, wherein a buffer member is interposed between the guide member and the housing.

15. The key pad lighting apparatus according to claim 14, wherein the buffer member is formed of a resiliently deformable material.

16. The key pad lighting apparatus according to claim 14, wherein the buffer member is formed of either polyurethane, silicone, or sponge.

17. The key pad lighting apparatus according to claim 1, wherein a portion of the waveguide is formed of a light guiding layer.

18. The key pad lighting apparatus according to claim 17, wherein the height regulating member regulates the height of the waveguide adjacent to the light source to arrange the light guiding layer in an optical axis of the light source.

19. The key pad lighting apparatus according to claim 13, wherein a buffer member is interposed between the guide member and the printed circuit board.

* * * * *